Oct. 10, 1939.     F. S. HODGMAN     2,175,799
ELECTROHYDRAULIC TELEMOTOR
Filed June 3, 1936     2 Sheets—Sheet 1
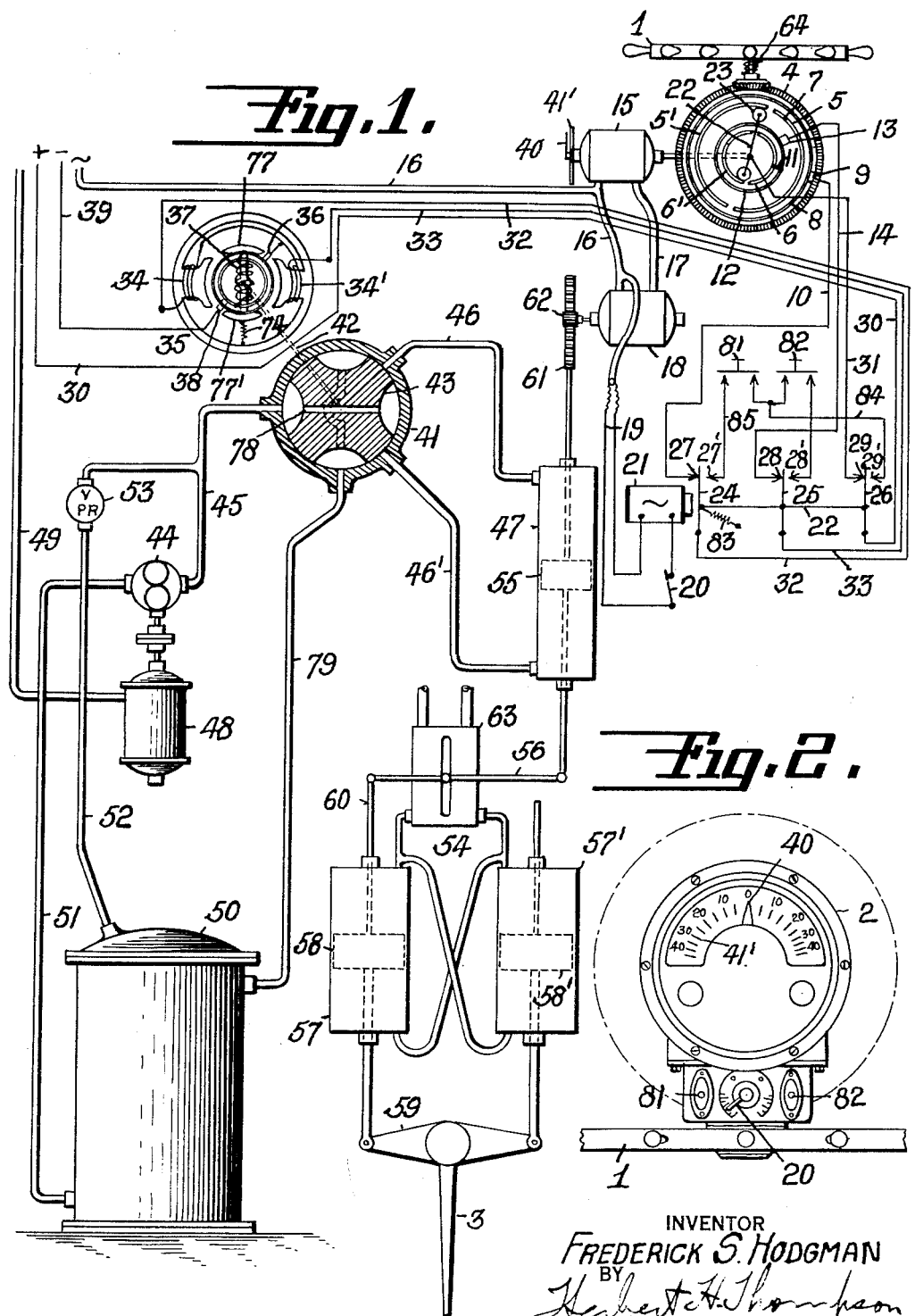
INVENTOR
FREDERICK S. HODGMAN
BY
HIS ATTORNEY.

Oct. 10, 1939.     F. S. HODGMAN     2,175,799
ELECTROHYDRAULIC TELEMOTOR
Filed June 3, 1936     2 Sheets-Sheet 2
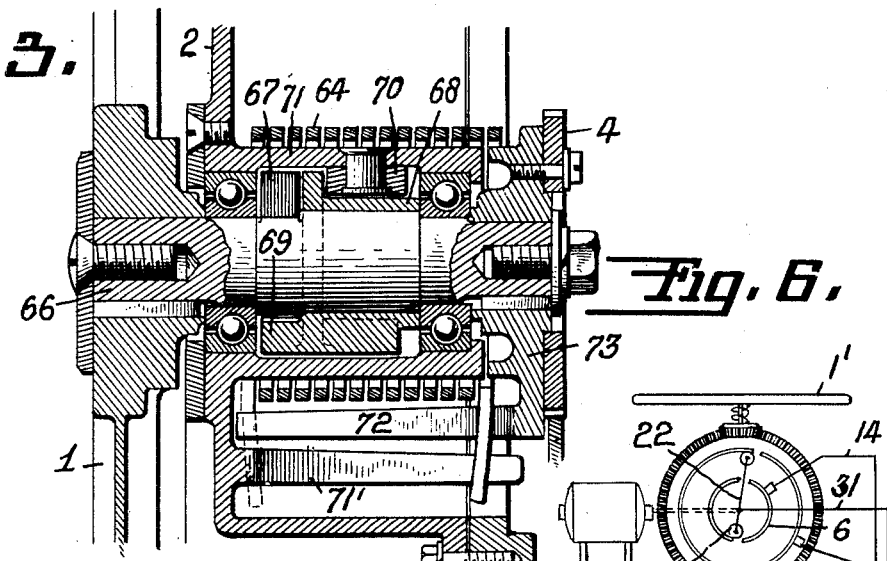
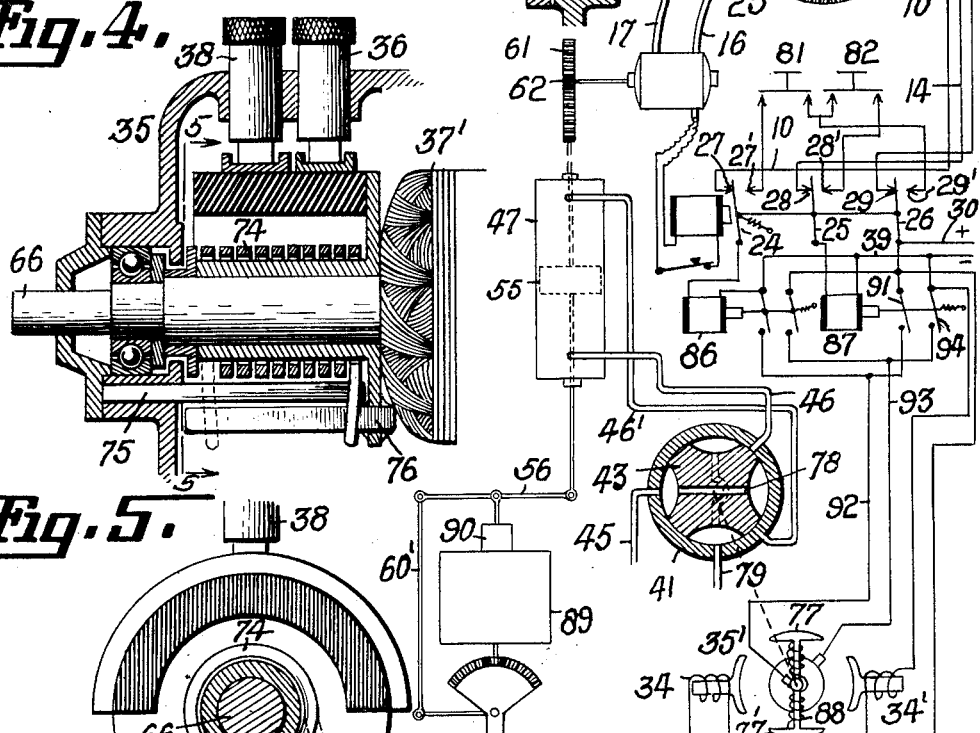
INVENTOR
Frederick S. Hodgman
BY
HIS ATTORNEY.

Patented Oct. 10, 1939

2,175,799

UNITED STATES PATENT OFFICE 2,175,799

ELECTROHYDRAULIC TELEMOTOR

Frederick S. Hodgman, Glen Rock, N. J., assignor to Sperry Gyroscope Company, Inc., Brooklyn, N. Y., a corporation of New York Application June 3, 1936, Serial No. 83,216

10 Claims. (Cl. 114—144)

This invention relates, generally, to the steering of dirigible craft and the invention has reference, more particularly, to a novel electro-hydraulic telemotor especially suited for use in controlling the steering of water craft and for other uses requiring the positional control of an object.

Heretofore, hydraulic telemotors have been used to control the steering of ships, but such telemotors are quite bulky and require considerable space to install aboard ship, the same requiring bulky apparatus at the helmsman's stand in the pilot house in addition to piping running from said stand back to the steering engine, and additional bulky apparatus at such engine. Also, such relatively long length of piping results in unsatisfactory operation due to expansion and contraction of the motive fluid used, resulting from temperature changes. Such telemotors are difficult to operate, especially on the larger ships, since the helmsman himself must exert all the effort which appears at the engine valve. Further, these telemotors heretofore used are not self-synchronous and the wheel must be manually aligned with the rudder before connecting up, and this requires a pilot house indicator to continuously show the position of the rudder. Further, when using most hydraulic telemotors, the rudder is constantly trying to creep out of alignment with the wheel and will do so unless a heavy centering spring is fitted to the after ram, which increases the effort required to operate the system and further requires frequent operation of a by-pass valve on the bridge unit in order to preserve alignment.

The principal object of the present invention is to provide a novel compact and easily installed electro-hydraulic telemotor that is extremely accurate and completely self-synchronous, i. e., the rudder or other controlled member is automatically operated so as to be always aligned with the steering wheel or other controlling member, the said telemotor being so constructed that should the rudder become out of alignment with the steering wheel, as by turning the latter with the power of the system shut off, or when shifting the control from one steering stand to another, the rudder will immediately align itself with the steering wheel when the power is turned on, in the first instance, and when the shift from one stand to another is completed, in the second instance.

Another object of the present invention lies in the provision of a novel electro-hydraulic telemotor of the above character having a hydraulic servo motor for moving the valve of the steering engine to effect the steering of the vessel, the said servo motor being capable, if desired, of operating the tiller directly, said telemotor having an electrical repeat-back to the pilot stand at which indicating means is provided for continuously showing the actual position of the steering engine valve gear.

Still another object of the present invention is to provide a novel electro-hydraulic telemotor or steering control wherein the hydraulic servo mechanism is confined to the after part of the vessel, the only connection between the steering wheel in the pilot house and the hydraulic servo mechanism being an electrical cable, thereby eliminating the ills of hydraulic telemotor systems and greatly reducing installation costs.

A further object of the present invention lies in the provision of a novel electro-hydraulic telemotor of the above character that is so constructed and arranged that the steering stand is light, compact and completely self-contained, the steering wheel being called upon merely to operate contact means cooperable with the electrical repeat-back mechanism and hence may be turned without appreciable effort regardless of the size of the craft controlled, a light centering spring being provided on the wheel for returning the same to midships whenever it is released, thereby facilitating steering by direct observation of range marks or compass card, without thought of the wheel position.

Other objects and advantages will become apparent from the specification, taken in connection with the accompanying drawings wherein one embodiment of the invention is illustrated.

In the drawings,

Fig. 1 is a simple diagrammatical representation of an embodiment of the invention.

Fig. 2 is a fragmentary plan view of the steering stand.

Fig. 3 is a fragmentary vertical sectional view illustrating the steering wheel centering spring and associated parts.

Fig. 4 is a fragmentary vertical sectional view showing the centering spring and associated parts of the pilot valve operating motor.

Fig. 5 is a sectional view taken along line 5—5 of Fig. 4.

Fig. 6 is a view similar to Fig. 1, but of a slightly modified form of the invention.

Referring now to Figs. 1 to 5 of the drawings, reference numeral 1 designates a steering wheel or controlling member mounted on a steering stand 2 adapted to be located in any desired position on the craft, such as in the pilot house, said wheel being adapted to control the movements of the ship's rudder 3 or controlled member located at the stern. As especially shown in Fig. 1, the steering wheel 1 is adapted to operate through suitable gearing 4 to turn substantially semi-circular contact segments 5 and 6, the contact segment 5 being connected by a jumper 7 to a slip ring 8 which is engaged by brush 9, connected to a lead 10. The contact segment 6 is connected by a jumper 11 to a slip ring 12, upon which bears a brush 13 connected to a lead 14. Within the steering stand 2 there is provided a repeating motor 15 of the selsyn or A. C. self-synchronous type such as that disclosed in my prior Patent #2,015,183, the said motor having its armature shaft connected for turning an arm 22 carrying roller contacts 23 adapted to engage contact segments 5 and 6. The armature shaft of motor 15 is also connected for turning a pointer 40 over a scale 41' (see Figs. 1 and 2) to thereby continuously indicate the actual position of the steering engine valve gear, as will further appear.

Repeater motor 15 has its field winding energized from a suitable single phase source and supplied through cable 16, while the armature of this repeater is connected by a cable 17 to the armature of a transmitting motor 18 that is similar to motor 15, the said transmitter 18 having its field winding energized from cable 16. Leads 19, from cable 16, are connected through a switch 20 mounted on the steering stand to a relay coil 21 having an armature 22. With switch 20 closed, energizing the coil 21, the blades 24, 25 and 26 of the relay engage contacts 27, 28 and 29, thereby connecting a supply lead 30 through blade 26 and lead 31 to the roller arm 22 and connecting leads 10 and 14 through blades 24 and 25, respectively, and leads 32 and 33 to the field windings 34 and 34' of a pilot valve operating motor 35. The field windings 34 and 34' are connected together and to a brush 36 engaging one slip ring of the rotor winding 37, the other slip ring of this rotor winding being connected through a brush 38 to the other supply lead 39.

The rotor of motor 35 is connected as by shaft 42 for operating the rotary valve element 43 of a pilot or reversing valve 41. Valve element 43 is preferably fully balanced, as shown, so as to turn readily and serves to control the flow of hydraulic pressure fluid from gear pump 44 through pipe 45 to pipes 46 and 46' leading to the oil cylinder or hydraulic servo motor 47. Pump 44 is driven by an electric motor 48 supplied by cable 49 from a suitable source and draws pressure fluid from reservoir 50 through pipe 51 to be supplied to pipe 45. A bypass pipe 52 connects pipe 45 to reservoir 50 and has an adjustable pressure relief valve 53 therein for regulating the pressure of the pressure or operating fluid supplied to servo motor 47.

The hydraulic servo motor 47 is located in the after part of the vessel conveniently near the steering engine 54, as is also true of the pilot valve operating motor 35, pilot valve 41, pump 44 and reservoir 50, thereby reducing the length of piping containing pressure fluid to a minimum, thereby eliminating troubles due to temperature expansion and contraction while also greatly simplifying and cheapening the cost of installation of the system. Servo motor 47 has a double acting, double ended piston or ram 55 therein having one end or rod connected through link 56 for operating the valve 63 of the steering engine 54. This steering engine is illustrated as of the hydraulic type having cylinders 57 and 57' and double acting rams 58 and 58' connected for operating the tiller 59. A repeat-back connection between the tiller 59 and valve 63 is provided by ram rod 60 and link 56. The other end or rod of piston 55 of the servo motor 47 is connected to a rack 61 that acts through gear 62 to drive the repeat back transmitter 18.

The steering wheel 1 is illustrated as provided with a light centering torsion spring 64 (see Figs. 1 and 3) for returning the wheel to neutral or midships position, i. e., corresponding to midships position of rudder, whenever the wheel is released. In Fig. 3 of the drawings, means is shown for providing for three-quarters of a revolution of the wheel 1 in either direction from neutral or midships position to obtain full rudder, or one and one-half revolutions of the steering wheel 1 corresponds to a movement of the rudder 3 from hard-over to hard-over. In Fig. 3, the wheel 1 is shown fixed on shaft 66, having a boss 67 thereon. Turnably mounted on shaft 66 is a collar 68 having a lug 69 thereon projecting into the annular path of movement of boss 67, so that as shaft 66 is turned, boss 67 will engage lug 69 and turn collar 68 until lug 69 also abuts a fixed stop 70 carried by a hollow cylindrical portion 71 of the steering wheel stand 2. Stand 2 is provided with a stationary finger 71' against the opposite sides of which the opposite end portions of the spring 64 are adapted to bear. Spring 64 is shown surrounding cylindrical portion 71 of the stand 2 and its end portions are also shown bearing against the opposite sides of a movable finger 72 carried by a collar 73 fixed on shaft 66, to which collar the gearing 4 is connected.

When wheel 1 is turned in either direction from its neutral position shown in Fig. 3, the finger 72 serves to deflect either one or the other of the ends of spring 64, depending on the direction in which the wheel is turned, the remaining spring end abutting stationary finger 72. After the wheel 1 has been turned through less than a half revolution in either direction, the boss 67 will abut lug 69 and turn collar 68 until lug 69 abuts stop 70, which occurs when the wheel has been turned three-fourths of a revolution in either direction from neutral. As soon as the wheel 1 is released, the spring 64 immediately returns the same to neutral position.

The pilot or reversing valve operating motor 35 has its rotor 37' also provided with a centering torsion spring 74 similar to spring 64 (see Figs. 1, 4 and 5). The end portions of spring 74 are adapted to bear against opposite sides of a stationary finger 75 fixed in the motor frame and against the opposite sides of a movable finger 76 fixed on the rotor 37' when the rotor is in its neutral position corresponding to neutral position of pilot valve rotary element 43. With motor 35 in its neutral position, the poles 77 and 77' of its rotor (see Fig. 1) extend at right angles to the motor field poles.

In operation, with switch 20 closed as shown in Figs. 1 and 2, and the roller contacts 23 on the dead segments 5' and 6' as shown in Fig. 1, the steering wheel 1 is in its neutral position corresponding to the midships position of the steering engine valve gear and rudder 3. If, now, the steering wheel 1 is turned to the right for the purpose of throwing the rudder 3 to starboard, the gearing 4 serves to move the contact segments so that one of the roller contacts 23 engages segment 6, thereby completing the circuit for the pilot valve operating motor 35 and causing the rotor of this motor to turn clockwise in Fig. 1 through a fraction of a revolution, causing a similar turning of rotary valve element 43. The circuit for motor 35 may be traced as follows: from supply lead 30, blade 26, lead 31, arm 22, roller 23, contact segment 6, jumper 11, slip ring 12, lead 14, blade 25, lead 33, field pole winding 34', brush 36, rotor winding 37, brush 38 to supply lead 39. The energization of the field winding 34' and of the rotor winding 37 thus causes the rotor 37' to turn against the tension of spring 74 so that the pressure fluid from pipe 45 is supplied through cross passage 78 of the valve element 43 to pipe 46', thereby effecting movement of the hydraulic servo motor piston 55 in one direction, the fluid in advance of piston 55 escaping through pipe 46, cross passage of valve element 43, and into pipe 79 leading to reservoir 50. The movement of piston 55 operates link 56 to actuate steering engine valve 63 and effect the supply of pressure fluid to hydraulic cylinders 57 and 57' of the steering engine, thereby actuating the rams 58 and 58' to cause the turning of rudder 3 to starboard, the connection between link 56 and ram rod 60 serving to afford a follow-up connection between the hydraulic steering engine and valve 63 so that rudder 3 is operated through an angle proportional to the extent of movement of piston 55 of the servo motor. The movements of piston 55 also serve to actuate rack 61 which, in turn, acts through gear 62 to drive the rotor of transmitter 18 of the electrical repeat back connection between servo motor 47 and the steering stand contacts. The rotation of the rotor of motor 18 causes a corresponding rotation of the rotor of motor 15 which, in turn, actuates arm 22 to cause a follow-up movement of roller contacts 23, whereby the rudder 3 is brought into synchronism with the steering wheel 1 and then automatically stopped. Obviously, since the rudder movement is proportional to the movement of piston 55, the transmitter 18 could be driven off the rudder 3 directly, if desired.

Owing to the elimination of errors due to expansion and contraction of the pressure fluid and the inherent accuracy of the system, the hydraulic mechanism being located in the stern of the vessel and connected to the steering wheel 1 in the pilot house through an electrical cable containing the necessary electrical conduits, the system of the present invention is extremely accurate, with the result that the rudder 3 is always accurately positioned with respect to the steering wheel 1. In practice, it is found that the steering engine valve 63 responds instantly to the slightest movement of the steering wheel and the rudder is positioned at any angle desired between hard-over and hard-over with an accuracy within one-half degree or less. The turning of the repeater 15 to follow up the movements of the rudder 3 effects the turning of pointer 40 over scale 41', thereby giving to the helmsman a visual indication at all times of the throw of the rudder, so that he will accurately know in just what position the rudder and steering engine valve gear are located.

In the event that the hand wheel 1 is turned to the left, corresponding to movement of the rudder to port, roller contact 23 engages contact segment 5, thereby energizing field winding 34 of motor 35 in addition to the armature winding 37, thereby actuating pilot valve element 43 counter-clockwise and supplying pressure fluid through pipe 46 to cause the piston 55 of the servo motor to move in the opposite direction to that previously described to effect the left throw of the rudder. It will be noted that with pipe 46 supplying pressure fluid to the cylinder 47, the exhaust from cylinder 47 is by way of pipe 46', valve 41 and return pipe 79 leading to reservoir 50.

Should the steering wheel 1 be released, the centering spring 64 will immediately return this wheel to neutral or centered position, corresponding to the midships position of the steering engine valve and rudder 3. Hence, no wheel tell-tale pointer is required as the wheel returns to midships each time the same is released, thereby enabling steering by direct observation of range marks or compass card without thought of the wheel position.

Although supply leads 30 and 39 are shown supplied with direct current, it will be obvious that an A. C. supply may be used for the motor 35, and this is true of the remainder of the system. A D. C. ship supply may also be used, if desired, in which case a small converter will be used to supply the synchronous motors 15 and 18.

The present system owes its relative inexpensiveness and ease of installation to the fact that it is merely necessary to install a 9-wire cable carrying all the necessary leads from the relatively light, attractive and entirely self-contained steering column to the hydraulic apparatus located at the stern of the vessel, the piping of this hydraulic apparatus being extremely short, thereby overcoming difficulties due to temperature changes. The bulky equipment heretofore used in hydraulic systems is thereby completely eliminated. The steering stand is non-magnetic and its control circuits carry such low operating currents that the same may be located adjacent the magnetic compass without interference. Owing to the ease with which the wheel 1 may be turned, the same serving merely to operate the contacts 5 and 6, the largest vessels may be controlled with the same ease possible in controlling the smallest.

The action of the servo motor 47 and pilot valve 41 is such that the piston 55 may be positioned exactly to any desired rudder angle and held there firmly against any overhauling load, the relief valve 53 serving to maintain a constant pressure throughout the system, the fluid pressure exerted against the piston 55 serving to hold the engine valve 63 in any desired position without movement. It will be noted that when the rudder 3 has moved into synchronism with the steering wheel 1, the electrical follow-up provided by transmitter 18 and repeater 15 serves to bring the contact rollers 23 into the neutral positions shown in Fig. 1, in which positions no current is applied to motor 55, whereupon the centering spring 74 of this motor serves to return its rotor 37' to neutral position corresponding to neutral position of valve element 43, in which neutral position this valve serves to block off pipes 46 and 46', thereby locking the piston 55 of the servo motor in the desired position.

A push-button control is also provided for operating the rudder 3. This control consists of push buttons 81 and 82 (see Figs. 1 and 2), which push buttons are located on the steering column, and similar buttons may be located at various convenient points of the ship, if desired. When it is desired to operate the push-button control, it is merely necessary to open switch 20, thereby deenergizing relay coil 21 so that spring 83 of this relay causes the blades 24, 25 and 26 to engage contacts 27', 28' and 29', respectively. Thus, by pushing button 81, for example, a circuit is established for field winding 34 and armature winding 37 of motor 35, serving to actuate the valve element 43 counter-clockwise and effect movement of rudder 3 to port. The circuit for this operation may be traced as follows: from supply lead 30 through blade 26, contact 29', lead 84, button 81, lead 85, contact 27', blade 24, lead 32, winding 34, armature winding 37 to lead 39. The rudder 3 will move as long as the push button is depressed and in this control, as with wheel steering, the pointer 40 shows the angular position of the valve gear.

In case the power supply to the system should be disconnected either intentionally or by accident, the rudder 3 will automatically align itself with the position of the steering wheel 1 upon the resumption of the supply of power.

The connections for steering engine valve 63 are preferably such that the rudder 3 is moved to hard-over position just before the servo motor piston 55 reaches the limit of its travel in either direction, thereby eliminating the necessity of limit switches and at the same time preventing the piston 55 from engaging the ends of cylinder 47, although such engagement is not objectionable and may limit the movement of the piston 55 when the push-button control is employed.

In the form of the invention thus far disclosed, the pilot valve operating motor 35 is illustrated as a series type motor, although it will be apparent that other types of motors may be used and that even a solenoid may be used in place of this motor, if desired. In the form of the invention shown in Fig. 6, the pilot valve operating motor 35' is illustrated as a shunt wound motor, and in this modification additional relays 86 and 87 are employed for controlling the direction of flow of current through the armature winding 88 of motor 35', thereby determining the direction of movement of this motor. Parts of the system of Fig. 6 that are similar to parts of Fig. 1 are correspondingly numbered. In Fig. 6, the steering engine 89 is illustrated as a steam engine having a control valve 90 operated from link 56 connected to piston 55 of the servo motor 47.

Assuming the hand wheel 1' is turned to starboard, one of the contact rollers 23 will engage contact segment 6, thereby completing a circuit for relay 87. This circuit may be traced as follows: lead 30, blade 26, lead 31, arm 22, roller 23, segment 6, lead 14, blade 25 and relay 87 to supply lead 39. Relay 87 operates to connect lead 30 through blade 91 and lead 92 through rotor winding 88 of motor 35' and lead 93 and blade 94 to lead 39. The operation of pilot valve motor 35' serves to actuate rotary valve element 43 just as described in connection with the previous form of the invention, thereby effecting the desired movement of the rudder 3, a follow-up link 60' being provided between rudder 3 and valve 90 of steering engine 89.

In the event that wheel 1 is turned to port, the relay 86 will be operated to effect movement of the motor 35' in the reverse direction, thereby effecting the movement of rudder 3 to port. The push-button control is provided in this form of the invention just as in the previous form.

Although the servo motor 47 is shown connected for operating the control valves of steering engines, yet it is to be understood that, if desired, this servo motor 47 may be used for directly actuating the tiller of the rudder, thereby eliminating the steering engine. This is especially desirable on smaller vessels and it will be noted that the cylinder 47 may be made of such diameter and the operating fluid pressure may be made of such value as to readily operate any tiller. Although a single pump 44 has been shown, it will be apparent that an additional pump or pumps may be used, if desired, thereby allowing for the shutting down of one pump, as when making repairs.

It will be noted that no complicated springs or valves are required in the present system, thereby greatly simplifying the arrangement and providing for reliable and permanent operation. The continuous, self-synchronous nature of the system is highly advantageous, as it eliminates difficulties heretofore present in maintaining alignment between the rudder and the steering wheel. In use, there is substantially no lag between the rudder and the movement of the steering wheel 1, the rudder moving with the wheel as it is turned, and moving through an angle proportional to the wheel angle.

It will be apparent that the novel electro-hydraulic telemotor of this invention is adapted for automatic steering as well as manual steering. When used for automatic steering, the contact segments 5 and 6 are turned by a suitable controlling member, such as a repeater compass motor, in a manner similar to that shown in my prior Patent # 1,725,599, a differential providing for selective manual or automatic control, as desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an electro-hydraulic telemotor for operating the rudders of dirigible craft, a steering wheel, a two-part slider and ring contact means actuated by movement of said steering wheel permitting unlimited free turning of said wheel, a source of electrical power connected to said contact means, a pilot valve motor electrically connected to said contact means to be controlled thereby, a pilot valve operated by said valve motor, a servo motor controlled from said valve, said servo motor being connected for determining the operation of the craft rudder, a self-synchronous electrical transmitter driven from said servo motor, and a self-synchronous electrical receiver electrically connected to said transmitter directly connected to said contact means, whereby when the rudder has reached a position corresponding to that of the steering wheel, said contact means opens the circuit of said valve motor to stop the operation of said servo motor.

2. An electro-hydraulic telemotor as defined in claim 1, wherein indicating means is provided at said controlling member, said indicating means being operated from said self-synchronous repeat-back means for indicating the position of said controlled member.

3. In an electro-hydraulic telemotor for operating the rudders of dirigible craft, a steering wheel, spring means tending to return said wheel to its center position, contact means actuated by movement of said steering wheel, a source of electrical power connected to said contact means, a pilot valve motor electrically connected to said contact means to be controlled thereby, a pilot valve operated by said valve motor, means for urging said valve motor and said valve to their neutral positions, a servo motor controlled from said valve, said servo motor being connected for determining the operation of the craft rudder, an electrical transmitter driven from said servo motor, and an electrical receiver connected to said transmitter and arranged for effecting a follow-up movement of said contact means, whereby, when the rudder has reached a position corresponding to that of the steering wheel, said contact means opens the circuit of said valve motor to stop the operation of said servo motor, thereby allowing said valve motor and said pilot valve to return to neutral position, the release of said steering wheel serving to automatically return the craft rudder to midship position.

4. In an electro-hydraulic telemotor for operating the rudders of dirigible craft, a servo motor for controlling the operation of the craft rudder, a steering wheel, spring means for biasing said wheel to midships position, contact members connected to be actuated by said wheel for controlling said servo motor, and electrical repeat-back means differentially operated in response to movement of said servo motor and the craft rudder for actuating said contact members to effect the stopping of said servo motor when the rudder and said wheel are in correspondence, said spring means causing said steering wheel, when the latter is released in any position other than midships position, to actuate said first named contact members and effect the return of the rudder to midships position.

5. In an electro-hydraulic telemotor for ships, a rudder arranged to be controlled as to position from the pilot house, a hydraulic servo motor for causing movement of said rudder, valve means for controlling said servo motor, electric motive means for actuating said valve means, a current supply circuit for said motive means, switching means at said pilot house and included in said supply circuit for controlling said motive means, said switching means comprising relatively movable contact members, a steering wheel and a self-synchrouous repeat-back connected from said servo motor for differentially operating said contact members, a transfer relay, and second switching means for controlling said motive means including a pair of push buttons, said transfer relay adapted to transfer the control of said motive means from said first to said second switching means.

6. In an electric telemotor for operating the rudders of dirigible craft, a steering wheel, electrical contacts operated from said steering wheel for controlling the movement of the rudder, and means for biasing said wheel to midships position, said means comprising a coil torsion spring surrounding the turning axis of said wheel, a stationary finger positioned so that its opposite sides are adapted to be engaged by the respective end portions of said spring, and a movable finger carried by said wheel also arranged so that its opposite sides are engaged by said spring end portions when said wheel is in midships position, the turning of said wheel from such position causing said movable finger to move one spring end portion away from said stationary finger.

7. In an electro-hydraulic telemotor for ships' rudders, a rudder arranged to be continuously controlled as to position from the pilot house, a hydraulic servo motor adjacent the rudder for causing movement of said rudder, valve means adjacent said motor for controlling said servo motor, a self-synchronous electrical transmitter directly connected to said motor, electric motive means for actuating said valve means, a current supply circuit for said motive means, a two element controller means at said pilot house and included in said supply circuit for controlling said motive means, and a self-synchronous electrical repeater controlled by said transmitter and directly connected to one element of said controller, said element adapted to allow unrestrained rotation of said repeater.

8. In an electro-hydraulic telemotor for ships' rudders, a rudder arranged to be controlled as to position from the pilot house, a hydraulic servo motor adjacent the rudder for causing movement of said rudder, valve means adjacent said motor for controlling said servo motor and for locking said servo motor and hence said rudder in desired position, electric motive means for actuating said valve means, a current supply circuit for said motive means, switching means at said pilot house and included in said supply circuit for controlling said motive means, an indicator at said pilot house, a continuously operable self-synchronous electrical transmitter controlled from said servo motor and rudder, and a self-synchronous electrical repeater controlled from said transmitter having a direct mechanical connection to said switching means and said indicator, whereby the latter serves to indicate the position of said rudder.

9. In an electro-hydraulic telemotor for operating the rudders of dirigible craft, a hydraulic servo motor for controlling the operation of the craft's rudder, a three position balanced valve causing said servo motor to stand still in its central position or to operate in one direction when in one displaced position and in another direction in the other displaced position, a normally centralized three position electrical means for so positioning said valve, a steering wheel, two part contact means for controlling said electrical means, said steering wheel positioning one part of said contact means, and self-synchronous repeat-back means operated from said servo motor and directly connected for unrestrained positioning of the other part of said contact means to effect the stopping of said servo motor with the rudder and wheel in correspondence.

10. In an electro-hydraulic telemotor for operating the rudders of dirigible craft, a steering wheel, contact means actuated by movement of said steering wheel, a source of electrical power connected to said contact means, a pilot valve motor electrically connected to said contact means to be controlled thereby, a pilot valve operated by said valve motor, a servo motor controlled from said valve, said servo motor being connected for determining the operation of the craft rudder, a self-synchronous electrical transmitter driven from said servo motor, a self-synchronous electrical receiver electrically connected to said transmitter directly connected to said contact means, whereby when the rudder has reached a position corresponding to that of the steering wheel, said contact means opens the circuit of said valve motor to stop the operation of said servo motor, a transfer relay, a switch to energize said relay, and a pair of manually operated push buttons, said relay adapted to transfer control of said valve motor from said contact means to said push buttons upon opening of said switch.

FREDERICK S. HODGMAN.